US012598015B2

(12) United States Patent
Huang et al.

(10) Patent No.: US 12,598,015 B2
(45) Date of Patent: Apr. 7, 2026

(54) CLOCK FREQUENCY SYNCHRONIZATION METHOD AND COMMUNICATION APPARATUS

(71) Applicant: Huawei Technologies Co., Ltd., Shenzhen (CN)

(72) Inventors: Yuanda Huang, Dongguan (CN); Kuo Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 18/513,915

(22) Filed: Nov. 20, 2023

(65) Prior Publication Data

US 2024/0097809 A1 Mar. 21, 2024

Related U.S. Application Data

(63) Continuation of application No. PCT/CN2022/076837, filed on Feb. 18, 2022.

(30) Foreign Application Priority Data

May 21, 2021 (CN) .......................... 202110557294.8

(51) Int. Cl.
*H04J 3/06* (2006.01)

(52) U.S. Cl.
CPC .......... *H04J 3/0623* (2013.01); *H04J 3/0641* (2013.01)

(58) Field of Classification Search
USPC ....................................................... 370/503
See application file for complete search history.

(56) References Cited

U.S. PATENT DOCUMENTS

2018/0294946 A1* 10/2018 Sinclair .................. H04B 10/61

* cited by examiner

*Primary Examiner* — Suhail Khan
(74) *Attorney, Agent, or Firm* — Slater Matsil, LLP

(57) ABSTRACT

In a method, a network device receives a combined optical signal, where the combined optical signal is obtained by coupling optical signals sent by a plurality of communication nodes. If the network device is not a master node, the network device detects whether a master label exists in the combined optical signal, where the master label indicates the master node. If it is detected that a first master label exists in the combined optical signal, where the first master label indicates a first master node, the network device synchronizes a local clock frequency with a clock frequency of the first master node.

20 Claims, 9 Drawing Sheets

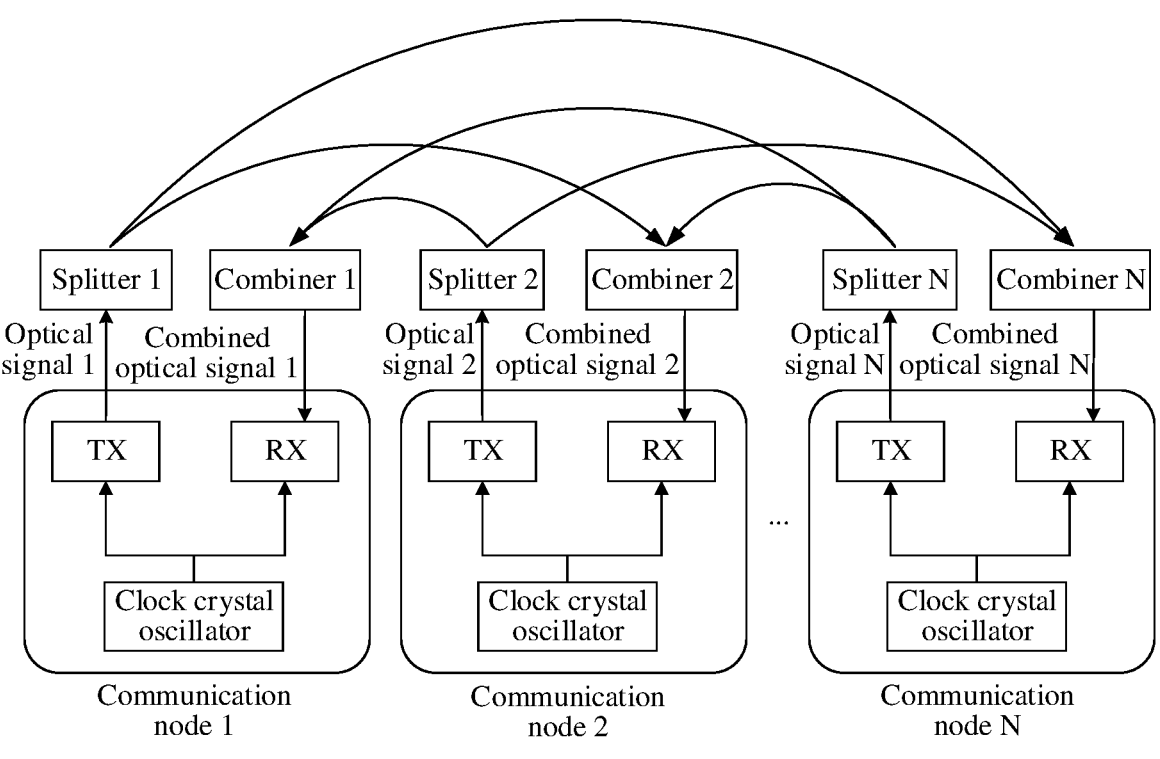

FIG. 3

401: A network device receives a combined optical signal, where the combined optical signal is obtained by coupling optical signals sent by a plurality of communication nodes 402: If the network device is not a master node, the network device detects whether a master label exists in the combined optical signal, where the master label indicates the master node 403: If it is detected that a first master label exists in the combined optical signal, where the first master label indicates a first master node, the network device synchronizes a local clock frequency with a clock frequency of the first master node

FIG. 4

501: A network device receives a combined optical signal, where the combined optical signal is obtained by coupling optical signals sent by a plurality of communication nodes

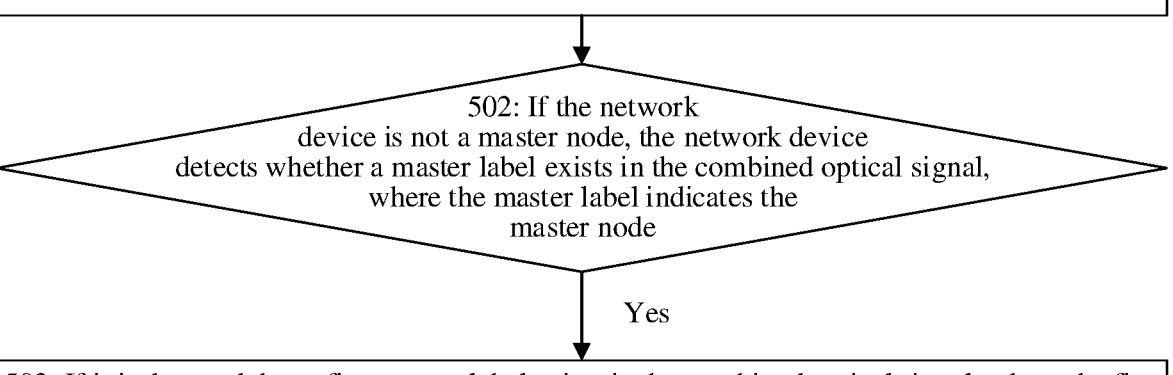

502: If the network device is not a master node, the network device detects whether a master label exists in the combined optical signal, where the master label indicates the master node Yes 503: If it is detected that a first master label exists in the combined optical signal, where the first master label indicates a first master node, the network device synchronizes a local clock frequency with a clock frequency of the first master node

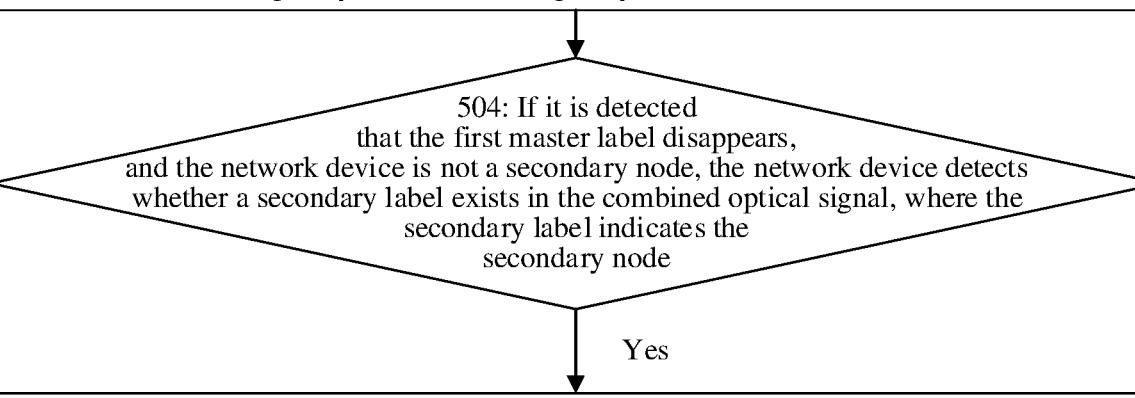

504: If it is detected that the first master label disappears, and the network device is not a secondary node, the network device detects whether a secondary label exists in the combined optical signal, where the secondary label indicates the secondary node Yes 505: If it is detected that a first secondary label exists in the combined optical signal, where the first secondary label indicates a first secondary node, the network device synchronizes the local clock frequency with a clock frequency of the first secondary node

FIG. 5

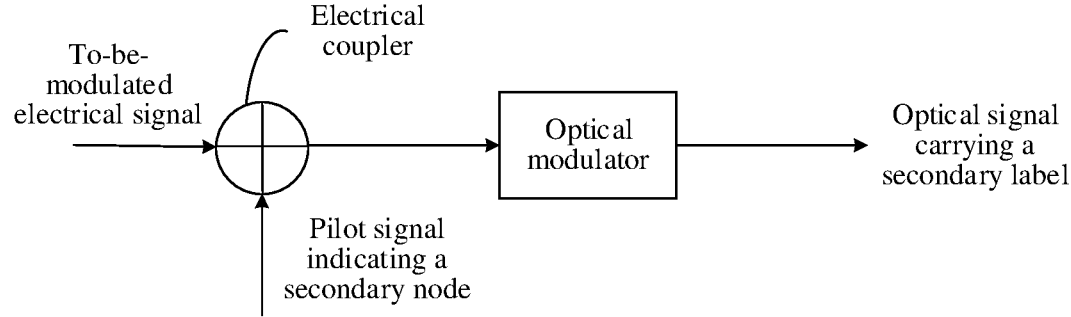
FIG. 8
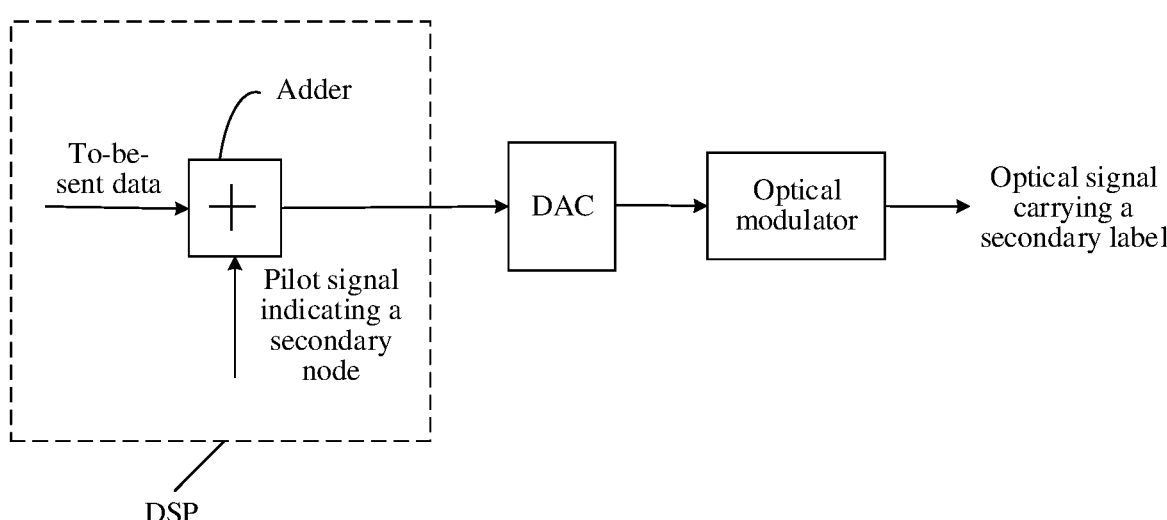
FIG. 9
| ←————T1————→ | ←————T2————→ |
|---|---|
| Training sequence | To-be-sent data |
FIG. 10

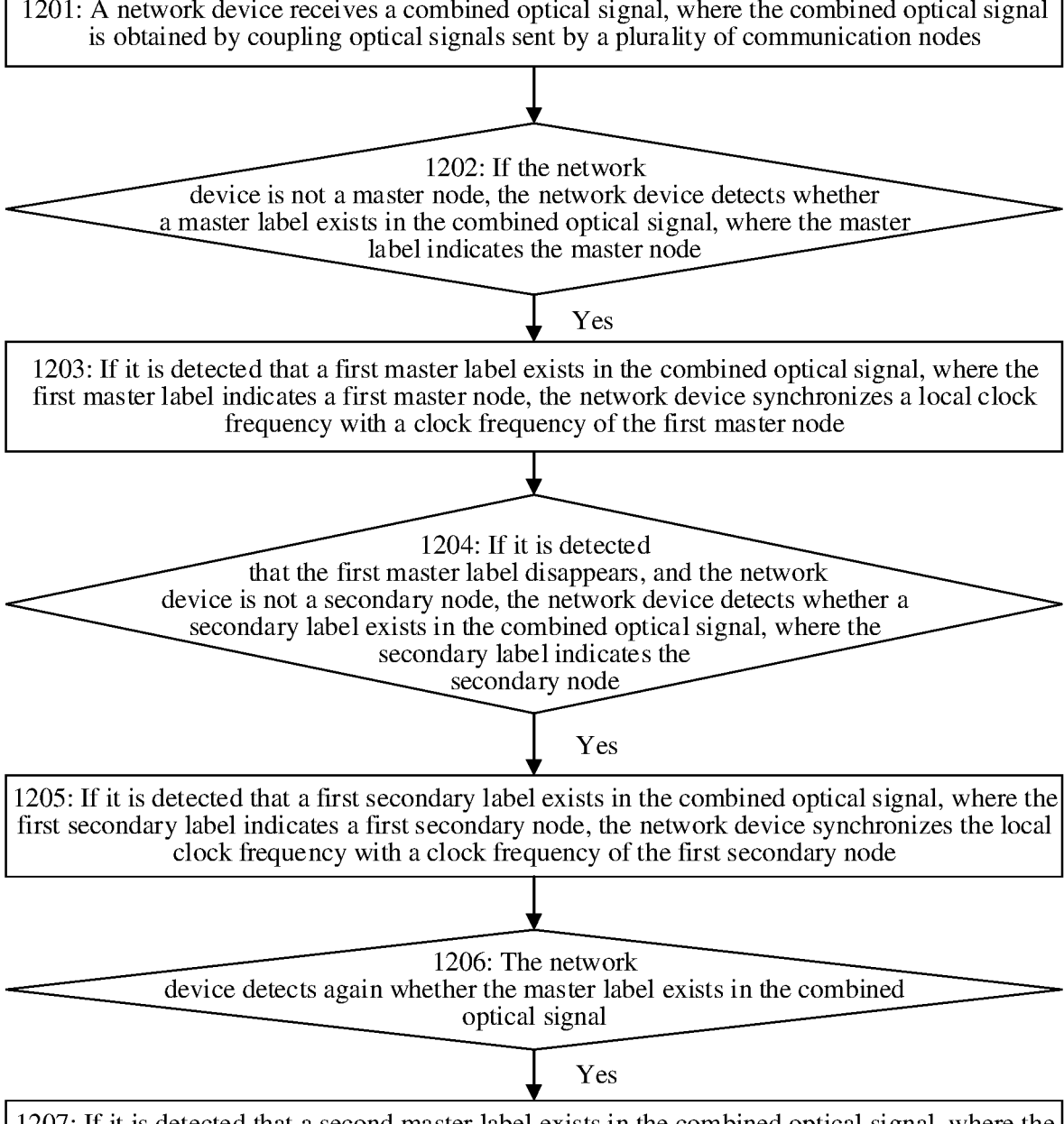

1201: A network device receives a combined optical signal, where the combined optical signal is obtained by coupling optical signals sent by a plurality of communication nodes 1202: If the network device is not a master node, the network device detects whether a master label exists in the combined optical signal, where the master label indicates the master node Yes 1203: If it is detected that a first master label exists in the combined optical signal, where the first master label indicates a first master node, the network device synchronizes a local clock frequency with a clock frequency of the first master node 1204: If it is detected that the first master label disappears, and the network device is not a secondary node, the network device detects whether a secondary label exists in the combined optical signal, where the secondary label indicates the secondary node Yes 1205: If it is detected that a first secondary label exists in the combined optical signal, where the first secondary label indicates a first secondary node, the network device synchronizes the local clock frequency with a clock frequency of the first secondary node 1206: The network device detects again whether the master label exists in the combined optical signal Yes 1207: If it is detected that a second master label exists in the combined optical signal, where the second master label indicates a second master node, the network device synchronizes the local clock frequency with a clock frequency of the second master node

FIG. 12

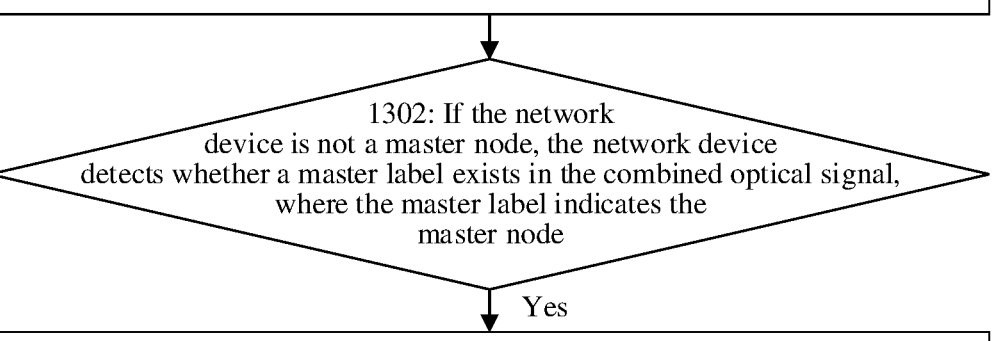

1301: A network device receives a combined optical signal, where the combined optical signal is obtained by coupling optical signals sent by a plurality of communication nodes 1302: If the network device is not a master node, the network device detects whether a master label exists in the combined optical signal, where the master label indicates the master node Yes 1303: If it is detected that a first master label exists in the combined optical signal, where the first master label indicates a first master node, the network device synchronizes a local clock frequency with a clock frequency of the first master node 1304: If it is detected that the first master label disappears, and the network device is a secondary node, the network device switches from sending an optical signal that carries a second secondary label to sending an optical signal that carries a third master label, where the second secondary label indicates that the network device is the secondary node, and the third master label indicates that the network device is the master node

FIG. 13

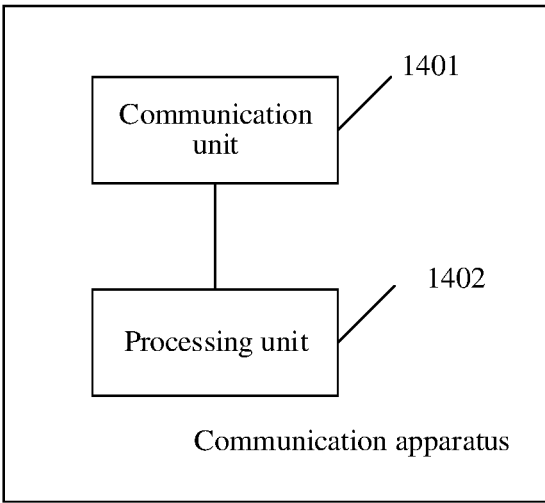

1401

Communication unit

1402

Processing unit

Communication apparatus

FIG. 14

CLOCK FREQUENCY SYNCHRONIZATION METHOD AND COMMUNICATION APPARATUS

CROSS-REFERENCE TO RELATED APPLICATIONS

This application is a continuation of International Application No. PCT/CN2022/076837 filed on Feb. 18, 2022, which claims priority to Chinese Patent Application No. 202110557294.8, filed on May 21, 2021. The disclosures of the aforementioned applications are hereby incorporated by reference in their entireties.

TECHNICAL FIELD

This application relates to the field of optical communication technologies, and in particular, to a clock frequency synchronization method and a communication apparatus.

BACKGROUND

With an increasing demand for bandwidth, multipoint-to-multipoint all-optical communication becomes a development trend in the future. As shown in FIG. 1, in a multipoint-to-multipoint all-optical communication system, an optical signal of each communication node is sent to another communication node, and simultaneously, each communication node receives optical signals from different communication nodes. Signals sent by the communication nodes are orthogonal to each other without interference. Orthogonality may be implemented through frequency division multiplexing (FDM), time division multiplexing (TDM), code division multiplexing (CDM), or various hybrid multiplexing. Each communication node has only one transmitter (TX as shown in the figure) and one receiver (RX as shown in the figure). The transmitter and the receiver each have a clock crystal oscillator, where the oscillator generates a clock signal to drive data to be modulated into an optical signal, or drive an optical signal to be demodulated into data.

Typically, in point-to-point optical communication, a clock crystal oscillator at a receiver may generate a clock signal that is synchronized with a drive clock frequency at a transmitter, to implement clock frequency synchronization (which means that frequencies of two clock signals differ by a fixed multiple). However, in the multipoint-to-multipoint all-optical communication system, because drive clock crystal oscillators of different communication nodes are independent of each other, a frequency deviation exists between crystal oscillators. As a result, clock frequency synchronization between communication nodes in the multipoint-to-multipoint all-optical communication system cannot be ensured.

SUMMARY

This application provides a clock frequency synchronization method and a communication apparatus, to help implement clock frequency synchronization between communication nodes in a multipoint-to-multipoint all-optical communication system.

According to a first aspect, this application provides a clock frequency synchronization method. The method includes: A network device receives a combined optical signal, where the combined optical signal is obtained by coupling optical signals sent by a plurality of communication nodes. If the network device is not a master node, the network device detects whether a master label exists in the combined optical signal, where the master label indicates the master node. If it is detected that a first master label exists in the combined optical signal, where the first master label indicates a first master node, the network device synchronizes a local clock frequency with a clock frequency of the first master node.

Based on the method described in the first aspect, the plurality of communication nodes may all perform clock frequency synchronization with a same communication node (namely, the master node). Therefore, the method described in the first aspect helps implement clock frequency synchronization between communication nodes in a multipoint-to-multipoint all-optical communication system.

In a possible implementation, if it is detected that the first master label disappears, and the network device is not a secondary node, the network device detects whether a secondary label exists in the combined optical signal, where the secondary label indicates the secondary node. If it is detected that a first secondary label exists in the combined optical signal, where the first secondary label indicates a first secondary node, the network device synchronizes the local clock frequency with a clock frequency of the first secondary node. Based on this possible implementation, after the master node disappears, clock frequency synchronization can also be performed between other communication nodes in a timely manner.

In a possible implementation, after the network device synchronizes the local clock frequency with the clock frequency of the first secondary node, the network device detects again whether the master label exists in the combined optical signal. If it is detected that a second master label exists in the combined optical signal, where the second master label indicates a second master node, the network device synchronizes the local clock frequency with a clock frequency of the second master node. Based on this possible implementation, when the master node appears again in a system, the clock frequency of the network device can be synchronized with that of the master node in a timely manner.

In a possible implementation, if it is detected that the first master label disappears, and the network device is a secondary node, the network device switches from sending an optical signal that carries a second secondary label to sending an optical signal that carries a third master label, where the second secondary label indicates that the network device is the secondary node, and the third master label indicates that the network device is the master node. Based on this possible implementation, the master node can appear in the system in a timely manner, so that another communication node can contend for serving as the secondary node.

In a possible implementation, in a process of synchronizing the local clock frequency with the clock frequency of the master node, if the network device is not the secondary node, the network device detects whether the secondary label exists in the combined optical signal, where the secondary label indicates the secondary node. If it is detected that no secondary label exists in the combined optical signal, the network device contends for serving as the secondary node. Based on this possible implementation, when no secondary node exists in the system, one communication node can be selected as the secondary node in a timely manner, so that when the master node disappears, a clock frequency of another communication node can be synchronized with that of the secondary node in a timely manner, to implement zero-latency switching between the master node and the secondary node.

In a possible implementation, a specific implementation of contending for serving as the secondary node is as follows: The network device sends the optical signal that carries the second secondary label. The network device detects whether a secondary label other than the second secondary label exists in the received combined optical signal. If no secondary label other than the second secondary label is detected, the network device successfully contends for serving as the secondary node. Based on this possible implementation, one communication node can be properly selected as the secondary node.

In a possible implementation, a specific implementation of contending for serving as the secondary node is as follows: The network device sends the optical signal that carries the second secondary label. The network device detects whether a secondary label other than the second secondary label exists in the received combined optical signal. If the secondary label other than the second secondary label is detected, the network device detects again, after a random latency, whether the secondary label other than the second secondary label exists in the received combined optical signal. If no secondary label other than the second secondary label is detected, the network device sends again the optical signal that carries the second secondary label, to contend again for serving as the secondary node. Based on this possible implementation, one communication node can be properly selected as the secondary node.

In a possible implementation, when it is detected that neither the master label nor the secondary label exists in the combined optical signal, the network device contends for serving as the master node, where the secondary label indicates the secondary node. Based on this possible implementation, when neither the master node nor the secondary node exists, the network device can contend for serving as the master node in a timely manner, so that clock frequency synchronization can be performed between a plurality of communication nodes in a timely manner.

In a possible implementation, a specific implementation of contending for serving as the master node is as follows: The network device sends the optical signal that carries the third master label. The network device detects whether a master label other than the third master label exists in the received combined optical signal. If no master label other than the third master label is detected, the network device successfully contends for serving as the master node. Based on this possible implementation, one communication node can be properly selected as the master node.

In a possible implementation, a specific implementation of contending for serving as the master node is as follows: The network device sends the optical signal that carries the third master label. The network device detects whether the master label other than the third master label exists in the received combined optical signal. If the master label other than the third master label is detected, the network device detects again, after the random latency, whether the master label other than the third master label exists in the received combined optical signal. If no master label other than the third master label is detected, the network device sends again the optical signal that carries the third master label, to contend again for serving as the master node. Based on this possible implementation, one communication node can be properly selected as the master node.

In a possible implementation, the secondary label includes identification information of a communication node that generates the secondary label. The identification information of the communication node that generates the secondary label is carried in the secondary label, so that it can be ensured that secondary labels generated by communication nodes are different. Therefore, in a process of contending for serving as the secondary node, the communication node can identify whether another communication node also sends an optical signal that carries the secondary label.

In a possible implementation, the secondary label is modulated to an optical signal in a pilot manner. Based on this possible implementation, the secondary label can be successfully modulated to the optical signal.

In a possible implementation, the master label includes identification information of a communication node that generates the master label. The identification information of the communication node that generates the master label is carried in the master label, so that it can be ensured that master labels generated by communication nodes are different. Therefore, in a process of contending for serving as the master node, the communication node can identify whether another communication node also sends an optical signal that carries the master label.

In a possible implementation, the master label is modulated to an optical signal in the pilot manner. Based on this possible implementation, the master label can be successfully modulated to the optical signal.

According to a second aspect, this application provides a communication apparatus. The apparatus may be a network device, an apparatus in the network device, or an apparatus that can be used together with the network device. The communication apparatus may alternatively be a chip system. The communication apparatus may perform the method in the first aspect. A function of the communication apparatus may be implemented by hardware, or may be implemented by hardware by executing corresponding software. The hardware or the software includes one or more units or modules corresponding to the foregoing function. The unit or module may be software and/or hardware. For operations performed by the communication apparatus and beneficial effects thereof, refer to the method in the first aspect and the beneficial effects thereof. Repeated parts are not described again.

According to a third aspect, this application provides a communication apparatus, where the communication apparatus includes a processor. When the processor invokes a computer program in a memory, the method in the first aspect is performed.

According to a fourth aspect, this application provides a communication apparatus. The communication apparatus includes a processor and a transceiver. The transceiver is configured to receive or send an optical signal. The processor is configured to implement the method in the first aspect.

According to a fifth aspect, this application provides a chip. The chip includes a processor and an interface, and the processor is coupled to the interface. The interface is configured to receive or send an optical signal. The processor is configured to execute code instructions, so that the method in the first aspect is performed.

According to a sixth aspect, this application provides a computer-readable storage medium, where the storage medium stores a computer program or instructions. When the computer program or the instructions are executed by a communication apparatus, the method in the first aspect is implemented.

According to a seventh aspect, this application provides a computer program product including instructions. When a computer reads and executes the computer program product, the computer is enabled to perform the method in the first aspect.

BRIEF DESCRIPTION OF THE DRAWINGS

FIG. 3 is a schematic diagram of still another communication system according to an embodiment of this application;

FIG. 4 is a schematic flowchart of a clock frequency synchronization method according to an embodiment of this application;

FIG. 5 is a schematic flowchart of another clock frequency synchronization method according to an embodiment of this application;

FIG. 8 is a schematic diagram of modulating a secondary label to an optical signal in a pilot manner according to an embodiment of this application;

FIG. 9 is another schematic diagram of modulating a secondary label to an optical signal in a pilot manner according to an embodiment of this application;

FIG. 10 is a schematic diagram in which a training sequence occupies a part of data transmission slots according to an embodiment of this application;

FIG. 12 is a schematic flowchart of still another clock frequency synchronization method according to an embodiment of this application;

FIG. 13 is a schematic flowchart of still another clock frequency synchronization method according to an embodiment of this application;

FIG. 14 is a schematic diagram of a structure of a communication apparatus according to an embodiment of this application.

DETAILED DESCRIPTION OF ILLUSTRATIVE EMBODIMENTS

The following further describes specific embodiments of this application in detail with reference to accompanying drawings.

In the specification, the claims, and the accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

In this application, "at least one (item)" means one or more, "a plurality of" means two or more, "at least two (items)" means two, three, or more, and "and/or" is used to describe a correspondence relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

To better understand the solutions provided in this application, the following describes a communication system in embodiments of this application.

Figure 1:
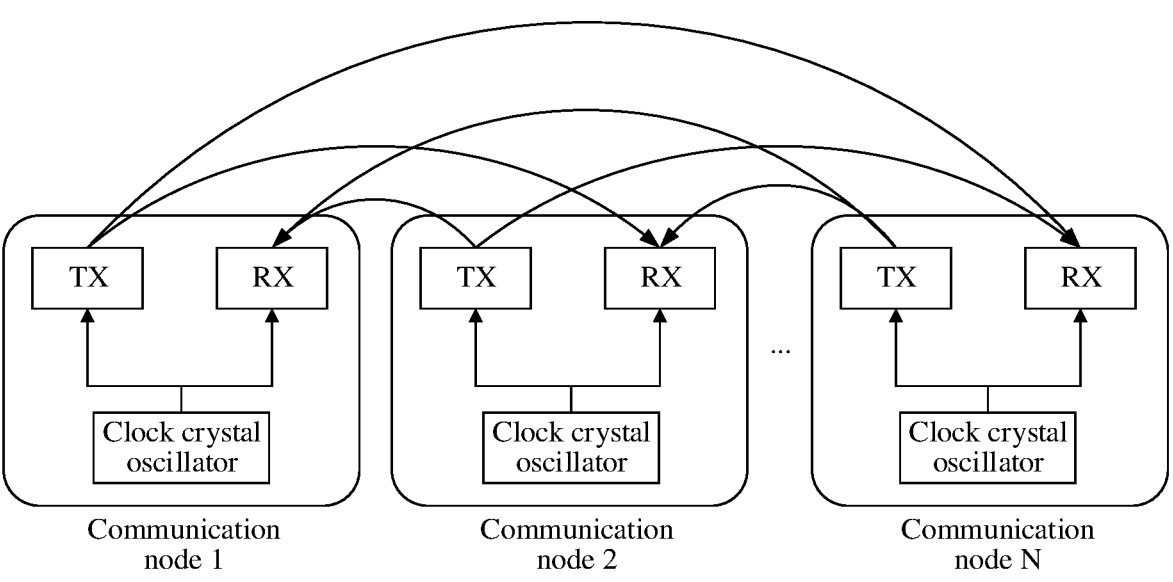
FIG. 1 is a schematic diagram of a communication system according to an embodiment of this application.

FIG. 1 is a schematic diagram of a communication system according to an embodiment of this application. As shown in FIG. 1, the communication system includes N communication nodes, where N is greater than or equal to 2.

The technical solutions provided in this application may be applied to a data center, and the communication node may be a network interface card of a server in the data center. Alternatively, the technical solutions provided in this application may be applied to a vehicle-mounted network, and the communication node may be a vehicle identification unit (VIU). Alternatively, the technical solutions provided in this application may be applied to satellite communication, and the communication node may be a satellite. The technical solutions provided in this application may alternatively be applied to another scenario of optical communication. This is not limited in this embodiment of this application.

In this embodiment of this application, each communication node has only one transmitter (TX in the figure) and one receiver (RX in the figure). The transmitter is configured to send an optical signal, and the optical signal sent out by the transmitter may be received by a plurality of communication nodes. The receiver is configured to receive a combined optical signal, where the combined optical signal is obtained by coupling optical signals sent by the plurality of communication nodes. For example, as shown in FIG. 1, an optical signal sent by a transmitter of a communication node 1 may be received by a communication node 2 to a communication node N. A receiver of the communication node 1 may receive a combined optical signal, where the combined optical signal is obtained by coupling optical signals sent by the communication node 2 to the communication node N. Optionally, the combined optical signal may alternatively be obtained by coupling optical signals sent by the communication node 1 to the communication node N. A principle of sending an optical signal and receiving an optical signal by another communication node is the same as that of the communication node 1, and details are not described herein.

As shown in FIG. 1, each communication node further has a clock crystal oscillator. The clock crystal oscillator is configured to generate a clock signal to drive data to be modulated into an optical signal, or drive an optical signal to be demodulated into data.

Figure 2:
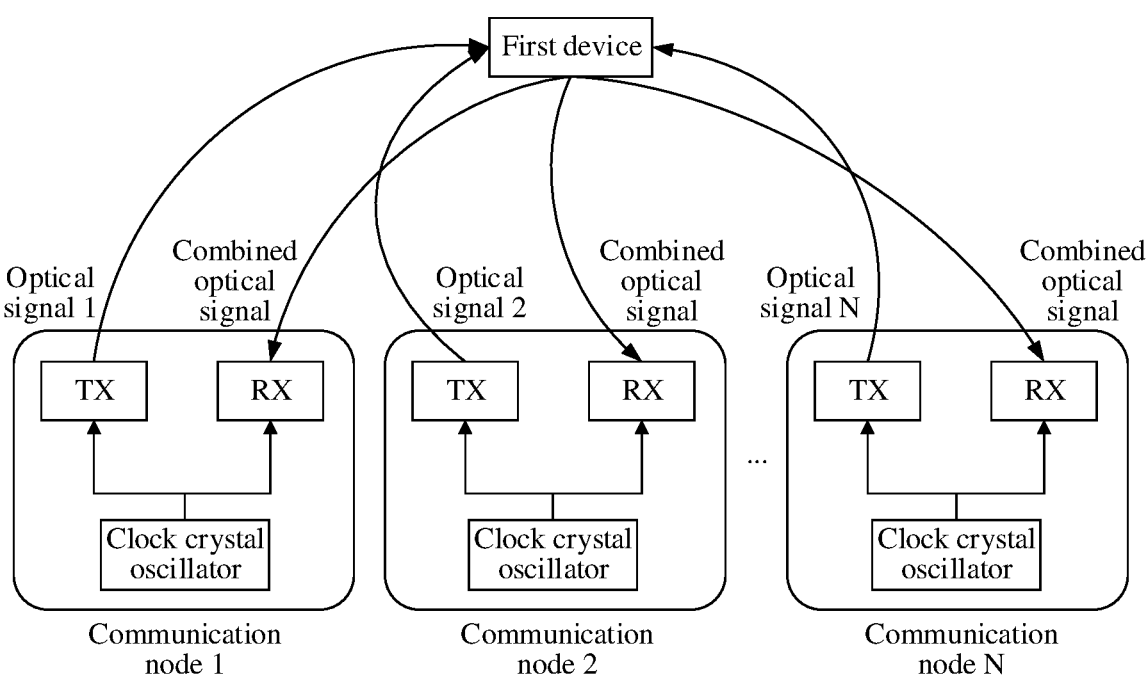
FIG. 2 is a schematic diagram of another communication system according to an embodiment of this application.

In a possible implementation, as shown in FIG. 2, the communication system may further include a first device. The first device has functions of optical splitting and optical combining. The communication node 1 to the communication node N separately send, to the first device, an optical signal 1 to an optical signal N by using transmitters. The first device couples the optical signal 1 to the optical signal N to obtain a combined optical signal, and separately sends the combined optical signal to receivers of the communication node 1 to the communication node N. Therefore, all the communication nodes receive the same combined optical signal that is obtained by coupling the optical signal 1 to the optical signal N.

In another possible implementation, as shown in FIG. 3, the communication system further includes N splitters and N combiners. One transmitter corresponds to one splitter, and one receiver corresponds to one combiner. The communication node 1 sends the optical signal 1 to a splitter 1 by using the transmitter, and the splitter 1 sends the optical signal 1 to a combiner other than a combiner 1. Similarly, the communication node 2 sends the optical signal 2 to a splitter 2 by using the transmitter, and the splitter 2 sends the optical signal 2 to a combiner other than a combiner 2. The communication node N sends the optical signal N to a splitter N by using the transmitter, and the splitter N sends the optical signal N to a combiner other than a combiner N.

As shown in FIG. 3, the combiner 1 may receive an optical signal sent by a splitter other than the splitter 1, to be specific, the optical signal 2 to the optical signal N. The combiner 1 couples the optical signal 2 to the optical signal N to obtain a combined optical signal 1, and sends the combined optical signal 1 to the receiver of the communication node 1. Similarly, the combiner 2 couples the received optical signals to obtain a combined optical signal 2, and sends the combined optical signal 2 to the receiver of the communication node 2. The combiner N couples the received optical signals to obtain a combined optical signal N, and sends the combined optical signal N to the receiver of the communication node N. In this architecture, the combined optical signal 1 to the combined optical signal N are different.

To implement clock frequency synchronization between communication nodes in a multipoint-to-multipoint all-optical communication system, embodiments of this application provide a clock frequency synchronization method and a communication apparatus. The following describes in detail the clock frequency synchronization method provided in embodiments of this application.

FIG. 4 is a schematic flowchart of a clock frequency synchronization method according to an embodiment of this application. As shown in FIG. 4, the clock frequency synchronization method includes the following step 401 to step 403. An execution body of the method shown in FIG. 4 may be a network device, for example, a chip in the network device. FIG. 4 is described by using an example in which the network device is the execution body of the method.

401: A network device receives a combined optical signal, where the combined optical signal is obtained by coupling optical signals sent by a plurality of communication nodes.

The network device is a communication node in a system. For example, it is assumed that the network device is the communication node 1 in FIG. 2. The communication node 1 may receive a combined optical signal, where the combined optical signal is obtained by coupling optical signals sent by the communication node 1 to the communication node N. For another example, it is assumed that the network device is the communication node 1 in FIG. 3. The communication node 1 may receive a combined optical signal, where the combined optical signal is obtained by coupling optical signals sent by the communication node 2 to the communication node N.

402: If the network device is not a master node, the network device detects whether a master label exists in the combined optical signal, where the master label indicates the master node.

403: If it is detected that a first master label exists in the combined optical signal, where the first master label indicates a first master node, the network device synchronizes a local clock frequency with a clock frequency of the first master node.

In this embodiment of this application, one communication node may be selected as the master node. At the same time, there is one master node in the system. The master node may generate a master label, and carry the master label in a sent optical signal. The master label indicates a communication node that serves as the master node. The master label may alternatively be referred to as another name. This is not limited in this embodiment of this application. After detecting that the master label exists in the received combined optical signal, a non-master node can synchronize a local clock frequency with a clock frequency of the master node. In this embodiment of this application, clock frequency synchronization may also be referred to as clock signal frequency synchronization. The clock frequency synchronization may mean that frequencies of two clock signals differ by a fixed multiple, in other words, frequencies of the two clock signals are not necessarily the same, or the clock frequency synchronization may mean that frequencies of two clock signals are the same.

Therefore, in this embodiment of this application, if the network device is not the master node, after receiving the combined optical signal, the network device detects whether the master label exists in the combined optical signal. If it is detected that the first master label exists in the combined optical signal, where first master label indicates the first master node, the network device synchronizes the local clock frequency with the clock frequency of the first master node. Optionally, the network device may specifically determine, from the combined optical signal based on the first master label, an optical signal from the first master node, then determine, based on the optical signal from the first master node, a clock frequency difference between the local clock frequency and the clock frequency of the first master node, and then synchronize, based on the clock frequency difference, the local clock frequency with the clock frequency of the first master node.

For example, it is assumed that there are four communication nodes, which are respectively a communication node 1 to a communication node 4. The communication node 1 is the master node. The communication node 1 sends an optical signal that carries the master label, where the master label indicates that the communication node 1 is the master node. A communication node 2 to the communication node 4 also send optical signals. The optical signals sent by the communication node 2 to the communication node 4 do not carry the master label.

The communication node 2 receives a combined optical signal, where the combined optical signal is obtained by coupling the optical signals sent by the communication node 1 to the communication node 4. Because the communication node 2 is not the master node, the communication node 2 detects whether the master label exists in the combined optical signal. After the communication node 2 detects that the master label exists in the combined optical signal, the communication node 2 determines, from the combined optical signal based on the master label, the optical signal from the communication node 1, then determines, based on the optical signal from the communication node 1, a clock frequency difference between a local clock frequency and a clock frequency of the communication node 1, and then synchronizes, based on the clock frequency difference, the local clock frequency with the clock frequency of the communication node 1.

Similarly, a communication node 3 receives a combined optical signal, where the combined optical signal is obtained by coupling the optical signals sent by the communication node 1 to the communication node 4. Because the communication node 3 is not the master node, the communication node 3 detects whether the master label exists in the combined optical signal. After detecting that the master label exists in the combined optical signal, the communication node 3 determines, from the combined optical signal based on the master label, the optical signal from the communication node 1, then determines, based on the optical signal from the communication node 1, a clock frequency difference between a local clock frequency and the clock frequency of the communication node 1, and synchronizes, based on the clock frequency difference, the local clock frequency with the clock frequency of the communication node 1.

Similarly, the communication node 4 also performs clock frequency synchronization with the communication node 1. A principle of clock frequency synchronization of the communication node 4 is the same as a principle of clock frequency synchronization of the communication node 2 and the communication node 3, and details are not described herein again.

It may be learned that, based on the method described in FIG. 4, the plurality of communication nodes may all perform clock frequency synchronization with a same communication node (namely, the master node). Therefore, the method described in FIG. 4 is performed to help implement the clock frequency synchronization between the communication nodes in the multipoint-to-multipoint all-optical communication system.

FIG. 5 is a schematic flowchart of another clock frequency synchronization method according to an embodiment of this application. As shown in FIG. 5, the clock frequency synchronization method includes the following step 501 to step 505. An execution body of the method shown in FIG. 5 may be a network device, for example, a chip in the network device. FIG. 5 is described by using an example in which the network device is the execution body of the method.

501: A network device receives a combined optical signal, where the combined optical signal is obtained by coupling optical signals sent by a plurality of communication nodes.

502: If the network device is not a master node, the network device detects whether a master label exists in the combined optical signal, where the master label indicates the master node.

503: If it is detected that a first master label exists in the combined optical signal, where the first master label indicates a first master node, the network device synchronizes a local clock frequency with a clock frequency of the first master node.

For a specific implementation of step 501 to step 503, refer to descriptions of step 401 to step 403 in the method embodiment corresponding to FIG. 4. Details are not described herein again.

504: If it is detected that the first master label disappears, and the network device is not a secondary node, the network device detects whether a secondary label exists in the combined optical signal, where the secondary label indicates the secondary node.

505: If it is detected that a first secondary label exists in the combined optical signal, where the first secondary label indicates a first secondary node, the network device synchronizes the local clock frequency with a clock frequency of the first secondary node.

In this embodiment of this application, one communication node may be selected as the secondary node. At the same time, there is one secondary node in a system. The secondary node may generate a secondary label, and carry the secondary label in a sent optical signal. The secondary label indicates a communication node that serves as the secondary node. The secondary label may also be referred to as another name. This is not limited in this embodiment of this application. After the master node disappears, after detecting that the secondary label exists in the received combined optical signal, another communication node can synchronize a local clock frequency with a clock frequency of the secondary node.

Therefore, in this embodiment of this application, if the network device detects that the first master label disappears, and the network device is not the secondary node, the network device detects whether the secondary label exists in the combined optical signal. If it is detected that the first secondary label exists in the combined optical signal, where the first secondary label indicates the first secondary node, the network device synchronizes the local clock frequency with the clock frequency of the first secondary node. Optionally, the network device may specifically determine, from the combined optical signal based on the first secondary label, an optical signal from the first secondary node, then determine, based on the optical signal from the first secondary node, a clock frequency difference between the local clock frequency and the clock frequency of the first secondary node, and then synchronize, based on the clock frequency difference, the local clock frequency with the clock frequency of the first secondary node.

For example, it is assumed that there are four communication nodes, which are respectively a communication node 1 to a communication node 4. The communication node 1 is the master node. A communication node 2 is the secondary node. The communication node 1 sends an optical signal that carries the master label, where the master label indicates that the communication node 1 is the master node. The communication node 2 sends an optical signal that carries the secondary label, where the secondary label indicates that the communication node 2 is the secondary node. A communication node 3 and the communication node 4 also send optical signals. The optical signals sent by the communication node 3 and the communication node 4 do not carry the master label nor the secondary label.

After the communication node 2 to the communication node 4 receive a combined optical signal, because the master label exists in the combined optical signal, the communication node 2 to the communication node 4 perform clock frequency synchronization with the communication node 1.

After the communication node 3 and the communication node 4 detect that the master label in the combined optical signal disappears, the communication node 3 and the communication node 4 detect whether the secondary label exists in the combined optical signal. After detecting that the secondary label exists in the combined optical signal, the communication node 3 and the communication node 4 determine, from the combined optical signal based on the secondary label, the optical signal from the communication node 2, then determine, based on the optical signal from the communication node 2, a clock frequency difference between a local clock frequency and a clock frequency of the communication node 2, and synchronize, based on the clock frequency difference, the local clock frequency with the clock frequency of the communication node 2.

It may be learned that, when the method described in FIG. 5 is performed, the secondary node exists in the system, and after the master node disappears, clock frequencies of other communication nodes may separately be synchronized with the clock frequency of the secondary node. Therefore, the method described in FIG. 5 is performed, so that after the master node disappears, clock frequency synchronization can also be performed between other communication nodes in a timely manner.

In a possible implementation, in a process of synchronizing the local clock frequency with the clock frequency of the master node, if the network device is not the secondary node, it is detected whether the secondary label exists in the combined optical signal. If it is detected that no secondary label exists in the combined optical signal, the network device contends for serving as the secondary node.

If the network device is not the secondary node, and the network device detects that no secondary label exists in the combined optical signal, it indicates that no secondary node exists in the current system. Therefore, based on this possible implementation, when no secondary node exists in the system, one communication node can be selected as the secondary node in a timely manner, so that when the master node disappears, a clock frequency of another communication node can be synchronized with the clock frequency of the secondary node in a timely manner, to implement zero-latency switching between the master node and the secondary node.

For example, it is assumed that there are four communication nodes, which are respectively a communication node 1 to a communication node 4. The communication node 1 is the master node. No secondary node exists in a system. In a process of performing clock frequency synchronization with the communication node 1, a communication node 2 to the communication node 4 detect whether the secondary label exists in a combined optical signal. After the communication node 2 to the communication node 4 detect that no secondary label exists in the combined optical signal, the communication node 2 to the communication node 4 contend for serving as the secondary node. One communication node in the communication node 2 to the communication node 4 may successfully contend for serving as the secondary node.

The following describes a specific implementation in which the network device contends for serving as the secondary node.

Figure 6:
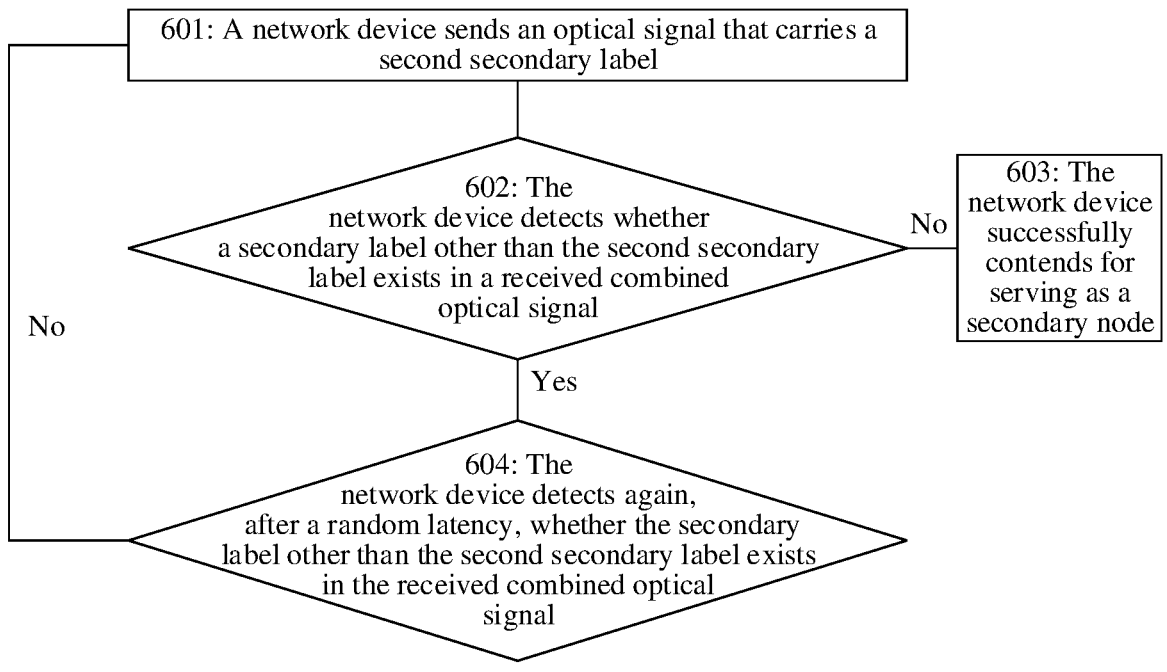
FIG. 6 is a schematic flowchart in which a network device contends for serving as a secondary node according to an embodiment of this application.

FIG. 6 is a schematic flowchart in which a network device contends for serving as a secondary node according to an embodiment of this application. As shown in FIG. 6, a procedure in which the network device contends for serving as the secondary node includes step 601 to step 604.

601: The network device sends an optical signal that carries a second secondary label.

602: The network device detects whether a secondary label other than the second secondary label exists in a received combined optical signal.

In this embodiment of this application, after sending the optical signal that carries the second secondary label, the network device detects whether the secondary label other than the second secondary label exists in the received combined optical signal.

603: If no secondary label other than the second secondary label is detected, the network device successfully contends for serving as the secondary node.

If no secondary label other than the second secondary label is detected, it indicates that no other communication node simultaneously contends, with the network device, for serving as the secondary node. Therefore, if the network device does not detect the secondary label other than the second secondary label, the network device successfully contends for serving as the secondary node.

604: If the secondary label other than the second secondary label is detected, the network device detects again, after a random latency, whether the secondary label other than the second secondary label exists in the received combined optical signal.

If the secondary label other than the second secondary label is detected, it indicates that another communication node simultaneously contends, with the network device, for serving as the secondary node. Therefore, the network device needs to detect again, after the random latency, whether the secondary label other than the second secondary label exists in the received combined optical signal. If the secondary label other than the second secondary label is detected again, the network device fails in contention. If the network device does not detect, after the random latency, the secondary label other than the second secondary label, step 601 is performed. To be specific, the network device sends again the optical signal that carries the second secondary label, to contend again for serving as the secondary node.

For example, communication nodes 2 to 4 contend for serving as the secondary node. 1. It is assumed that the communication node 2 first sends an optical signal that carries a secondary label 2. After sending the optical signal that carries the secondary label 2, the communication node 2 does not detect, in a combined optical signal, a secondary label other than the secondary label 2. Therefore, the communication node 2 successfully contends for serving as the secondary node. Because a communication node 3 and the communication node 4 detect the secondary label 2 in received combined optical signals, the communication node 3 and the communication node 4 each do not send an optical signal that carries the secondary label, in other words, the communication node 3 and the communication node 4 quit contending for serving as the secondary node. In other words, a communication node that first sends the optical signal that carries the secondary label in the communication node 2 to the communication node 4 may successfully contend for serving as the secondary node.

2. It is assumed that the communication node 2 to the communication node 4 simultaneously send optical signals that carry the secondary label, in other words, the communication node 2 to the communication node 4 simultaneously contend for serving as the secondary node. In this case, after sending the optical signal that carries the secondary label 2, the communication node 2 may detect a secondary label 3 and a secondary label 4 in the received combined optical signal. After detecting the secondary label 3 and the secondary label 4 in the received combined optical signal, the communication node 2 detects again, after a random latency of 2S (seconds), whether a secondary label other than the secondary label 2 exists in the received combined optical signal. If no secondary label other than the secondary label 2 is detected, the communication node 2 sends again the optical signal that carries the secondary label 2, to contend for serving as the secondary node. After sending the optical signal that carries the secondary label 2, the communication node 2 does not detect, in the combined optical signal, a secondary label other than the secondary label 2. Therefore, the communication node 2 successfully contends for serving as the secondary node.

Similarly, after sending an optical signal that carries the secondary label 3, the communication node 3 may detect the secondary label 2 and a secondary label 4 in the received combined optical signal. After detecting the secondary label 2 and the secondary label 4, the communication node 3 detects again, after a random latency of 4s (seconds), whether a secondary label other than the secondary label 3 exists in the received combined optical signal. The communication node 2 has started to send, after the random latency of 2S, the optical signal that carries the secondary label 2. Therefore, the communication node 3 may detect the secondary label 2 after the random latency of 4s. As a result, the communication node 3 fails to contend for serving as the secondary node.

Similarly, after sending an optical signal that carries the secondary label 4, the communication node 4 may detect the secondary label 2 and the secondary label 3 in the received combined optical signal. After detecting the secondary label 2 and the secondary label 3, the communication node 4 detects again, after a random latency of 6s (seconds), whether a secondary label other than the secondary label 4 exists in the received combined optical signal. The communication node 2 has started to send, after the random latency 2S, the optical signal that carries the secondary label 2. Therefore, the communication node 4 may detect the secondary label 2 after the random latency of 6s. As a result, the communication node 4 fails to contend for serving as the secondary node. Finally, the communication node 2 successfully contends for serving as the secondary node.

In a possible implementation, when it is detected that neither the master label nor the secondary label exists in the combined optical signal, the network device contends for serving as the master node.

When neither the master label nor the secondary label is detected in the combined optical signal, it indicates that neither the master node nor the secondary node exists in a system. Therefore, based on this possible implementation, when neither the master node nor the secondary node exists in the system, the network device can contend for serving as the master node in a timely manner, so that clock frequency synchronization can be performed between a plurality of communication nodes in a timely manner.

The following describes a specific implementation in which the network device contends for serving as the master node.

Figure 7:
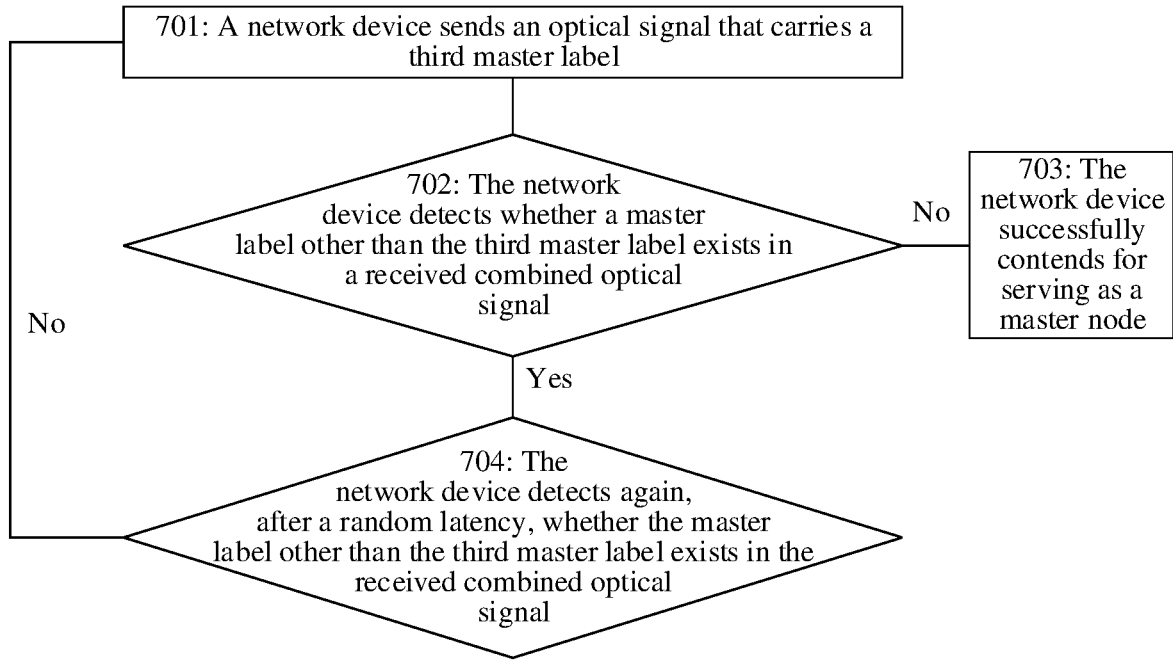
FIG. 7 is a schematic flowchart in which a network device contends for serving as a master node according to an embodiment of this application.

FIG. 7 is a schematic flowchart in which a network device contends for serving as a master node according to an embodiment of this application. As shown in FIG. 7, a procedure in which the network device contends for serving as the master node includes step 701 to step 704.

701: The network device sends an optical signal that carries a third master label.

702: The network device detects whether a master label other than the third master label exists in a received combined optical signal.

In this embodiment of this application, after sending the optical signal that carries the third master label, the network device detects whether the master label other than the third master label exists in the received combined optical signal.

703: If no master label other than the third master label is detected, the network device successfully contends for serving as the master node.

If no master label other than the third master label is detected, it indicates that no other communication node simultaneously contends, with the network device, for serving as the master node. Therefore, if the network device does not detect the master label other than the third master label, the network device successfully contends for serving as the master node.

704: If the master label other than the third master label is detected, the network device detects again, after a random latency, whether the master label other than the third master label is received.

If the master label other than the third master label is detected, it indicates that another communication node simultaneously contends, with the network device, for serving as the master node. Therefore, the network device needs to detect again, after the random latency, whether the master label other than the third master label exists in the received combined optical signal. If the master label other than the third master label is detected again, the network device fails in contention. If the network device does not detect, after the random latency, the master label other than the third master label, step 701 is performed. To be specific, the network device sends again the optical signal that carries the third master label, to contend again for serving as the master node.

A principle that the network device contends for serving as the master node is the same as a principle that the network device contends for serving as the secondary node. For a specific example that the network device contends for serving as the master node, refer to the foregoing specific example that the network device contends for serving as the secondary node. Details are not described herein again.

In a possible implementation, the secondary label includes identification information of a communication node that generates the secondary label. The secondary label may be any secondary label mentioned in embodiments of this application. For example, the foregoing secondary label 2 carries an identifier of the communication node 2. The foregoing secondary label 3 carries an identifier of the communication node 3. The foregoing secondary label 4 carries an identifier of the communication node 4.

Because an optical signal received by each communication node is a combined optical signal, if secondary labels sent by communication nodes are the same, in a process of contending for serving as the secondary node, the communication node may not identify whether another communication node also sends an optical signal that carries the secondary label. As a result, the communication node cannot contend for serving as the secondary node. The identification information of the communication node that generates the secondary label is carried in the secondary label, so that it can be ensured that secondary labels generated by communication nodes are different. Therefore, in the process of contending for serving as the secondary node, the communication node can identify whether another communication node also sends the optical signal that carries the secondary label.

In a possible implementation, the master label includes identification information of a communication node that generates the master label. The master label may be any master label mentioned in embodiments of this application. The identification information of the communication node that generates the master label is carried in the master label, so that it can be ensured that master labels generated by communication nodes are different. Therefore, in a process of contending for serving as the master node, the communication node can identify whether another communication node also sends an optical signal that carries the master label.

In a possible implementation, the secondary label is modulated to an optical signal in a pilot manner. The secondary label may be any secondary label mentioned in embodiments of this application.

For example, the communication node modulates the secondary label to the optical signal in the pilot manner by using the following four specific implementations.

1. The communication node processes a to-be-modulated electrical signal (namely, a service signal) and a pilot signal that indicates the secondary node by sequentially using an electrical coupler and an optical modulator, to obtain the optical signal that carries the secondary label.

For example, as shown in FIG. 8, the communication node first inputs the to-be-modulated electrical signal and the pilot signal into the electrical coupler. The electrical coupler couples the to-be-modulated electrical signal and the pilot signal to obtain a coupled signal, and inputs the coupled signal into the optical modulator. The optical modulator modulates the coupled signal to obtain the optical signal that carries the secondary label.

Optionally, the pilot signal that indicates the secondary node may be a low-speed pilot signal. Optionally, the pilot signal that indicates the secondary node may alternatively be a high-speed pilot signal.

Optionally, if there is no to-be-modulated electrical signal, the pilot signal that indicates the secondary node may alternatively be directly processed by using the optical modulator, to obtain the optical signal that carries the secondary label.

2. The communication node processes to-be-sent data (namely, service data) and a pilot signal that indicates the secondary node by sequentially using an adder, a digital-to-analog converter (DAC), and an optical modulator, to obtain the optical signal that carries the secondary label.

For example, as shown in FIG. 9, the communication node first inputs a to-be-modulated electrical signal and the pilot signal into the adder. The adder processes the to-be-modulated electrical signal and the pilot signal to obtain a processed signal, and inputs the processed signal into the DAC. The DAC converts the received signal into an analog signal, and inputs the analog signal into the optical modulator. The optical modulator modulates the analog signal to obtain the optical signal that carries the secondary label.

Optionally, the adder may be located in a digital signal processing unit (DSP unit). The DSP unit is generally located in a communication baseband signal processing chip of the communication node.

Optionally, the pilot signal that indicates the secondary node may be a low-speed pilot signal. Optionally, the pilot signal that indicates the secondary node may alternatively be a high-speed pilot signal.

Optionally, if there is no to-be-sent data, the pilot signal corresponding to the secondary label may alternatively be directly processed by sequentially using the DAC and the optical modulator, to obtain the optical signal that carries the secondary label.

3. The communication node sequentially processes a training sequence that indicates the secondary node by using a DAC and an optical modulator, to obtain the optical signal that carries the secondary label. The training sequence is located in a part of data transmission slots. For example, as shown in FIG. 10, the training sequence is located in a data transmission slot T1. The training sequence belongs to a pilot signal.

Specifically, the communication node first inputs the training sequence into the DAC. The DAC converts the training sequence into an analog signal, and inputs the analog signal into the optical modulator. The optical modulator modulates the analog signal to obtain the optical signal that carries the secondary label.

Figure 11:
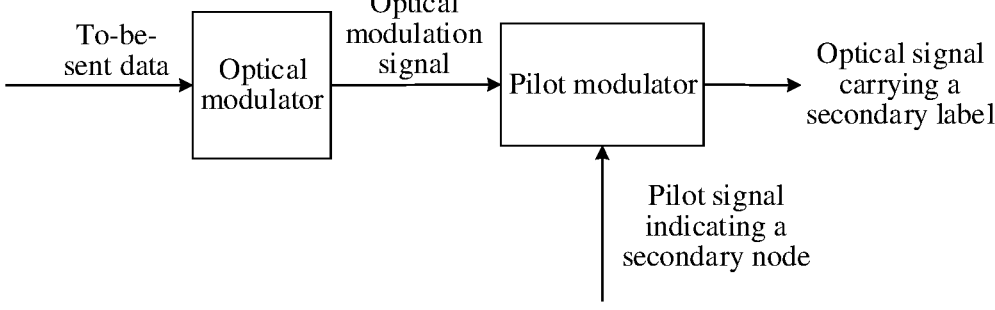
FIG. 11 is still another schematic diagram of modulating a secondary label to an optical signal in a pilot manner according to an embodiment of this application.

4. The communication node inputs a to-be-modulated electrical signal (namely, a service signal) into an optical modulator for processing, and then inputs a modulated optical signal that is obtained after processing by the optical modulator and a pilot signal that indicates a secondary node into a pilot modulator for processing, to obtain the optical signal that carries the secondary label. For example, this implementation is shown in FIG. 11.

Optionally, the pilot signal that indicates the secondary node may be a low-speed pilot signal. Optionally, the pilot signal that indicates the secondary node may alternatively be a high-speed pilot signal.

Optionally, the pilot modulator may be an electro-absorption modulator or another pilot modulator.

In a possible implementation, the master label is modulated to an optical signal in the pilot manner. The master label may be any master label mentioned in embodiments of this application. A specific implementation of modulating the master label to the optical signal in the pilot manner is the same as the specific implementation of modulating the secondary label in the optical signal in the pilot manner, and details are not described herein again.

FIG. 12 is a schematic flowchart of another clock frequency synchronization method according to an embodiment of this application. As shown in FIG. 12, the clock frequency synchronization method includes the following step 1201 to step 1207. An execution body of the method shown in FIG. 12 may be a network device, for example, a chip in the network device. FIG. 12 is described by using an example in which the network device is the execution body of the method.

1201: A network device receives a combined optical signal, where the combined optical signal is obtained by coupling optical signals sent by a plurality of communication nodes.

1202: If the network device is not a master node, the network device detects whether a master label exists in the combined optical signal, where the master label indicates the master node.

1203: If it is detected that a first master label exists in the combined optical signal, where the first master label indicates a first master node, the network device synchronizes a local clock frequency with a clock frequency of the first master node.

1204: If it is detected that the first master label disappears, and the network device is not a secondary node, the network device detects whether a secondary label exists in the combined optical signal, where the secondary label indicates the secondary node.

1205: If it is detected that a first secondary label exists in the combined optical signal, where the first secondary label indicates a first secondary node, the network device synchronizes the local clock frequency with a clock frequency of the first secondary node.

For a specific implementation of step 1201 to step 1205, refer to a specific implementation of the foregoing step 501 to step 505. Details are not described herein again.

1206: The network device detects again whether the master label exists in the combined optical signal.

In this embodiment of this application, after synchronizing the local clock frequency with the clock frequency of the first secondary node, the network device detects again whether the master label exists in the combined optical signal.

1207: If it is detected that a second master label exists in the combined optical signal, where the second master label indicates a second master node, the network device synchronizes the local clock frequency with a clock frequency of the second master node.

In a possible implementation, the second master node and the first secondary node may correspond to a same communication node. In other words, a communication node corresponding to the first secondary node may be upgraded to the second master node after the first master node disappears. In this way, the master node can appear in a system in a timely manner, so that another communication node may contend for serving as the secondary node.

For example, it is assumed that there are four communication nodes, which are respectively a communication node 1 to a communication node 4. The communication node 1 is the master node. A communication node 2 is the secondary node. The communication node 1 sends an optical signal that carries a master label 1, where the master label 1 indicates that the communication node 1 is the master node. The communication node 2 sends an optical signal that carries a secondary label 2, where the secondary label 2 indicates that the communication node 2 is the secondary node. A communication node 3 and the communication node 4 also send optical signals. The optical signals broadcast by the communication node 3 and the communication node 4 do not carry the master label nor the secondary label.

After the communication node 2 to the communication node 4 receive a combined optical signal, because the master label 1 exists in the combined optical signal, the communication node 2 to the communication node 4 perform clock frequency synchronization with the communication node 1.

After detecting that the master label 1 in the combined optical signal disappears, the communication node 2 switches from sending the optical signal that carries the secondary label 2 to sending an optical signal that carries a master label 2. In other words, the communication node 2 is upgraded to the master node.

Because there is a latency when the communication node 2 is upgraded to the master node, after the communication node 3 and the communication node 4 detect that the master label 1 in the combined optical signal disappears, the communication node 3 and the communication node 4 first detect whether the secondary label exists in the combined optical signal. After the communication node 3 and the communication node 4 detect that the secondary label 2 exists in the combined optical signal, the communication node 3 and the communication node 4 first synchronize, based on the secondary label 2, with a clock frequency of the communication node 2. After synchronizing clock frequencies with the clock frequency of the communication node 2, the communication node 3 and the communication node 4 detect whether the master label exists in the combined optical signal. After the communication node 3 and the communication node 4 detect the master label 2, the communication node 3 and the communication node 4 synchronize, based on the master label 2, with the clock frequency of the communication node 2.

In another possible implementation, the second master node and the first secondary node may alternatively correspond to different communication nodes.

FIG. 13 is a schematic flowchart of another clock frequency synchronization method according to an embodiment of this application. As shown in FIG. 13, the clock frequency synchronization method includes the following step 1301 to step 1304. The method shown in FIG. 13 may be executed by a network device, or a chip in the network device. FIG. 13 is described by using an example in which the network device executes the method.

1301: A network device receives a combined optical signal, where the combined optical signal is obtained by coupling optical signals sent by a plurality of communication nodes.

1302: If the network device is not a master node, the network device detects whether a master label exists in the combined optical signal, where the master label indicates the master node.

1303: If it is detected that a first master label exists in the combined optical signal, where the first master label indicates a first master node, the network device synchronizes a local clock frequency with a clock frequency of the first master node.

1304: If it is detected that the first master label disappears, and the network device is a secondary node, the network device switches from sending an optical signal that carries a second secondary label to sending an optical signal that carries a third master label, where the second secondary label indicates that the network device is the secondary node, and the third master label indicates that the network device is the master node.

In other words, after the first master node disappears, if the network device is the secondary node, the network device may be upgraded to the master node. In this way, a clock frequency of another communication node can continue to be synchronized with that of the master node, and the another communication nodes can contend for serving as the secondary node. For example, the network device may be the communication node 2 in the method embodiment corresponding to FIG. 12.

In a possible implementation, in a process of synchronizing the local clock frequency with the clock frequency of the master node, if the network device is not the secondary node, it is detected whether the secondary label exists in the combined optical signal. If it is detected that no secondary label exists in the combined optical signal, the network device contends for serving as the secondary node. For a specific implementation of the network device contending for serving as the secondary node, refer to descriptions in the foregoing method embodiments. Details are not described herein again.

In a possible implementation, when it is detected that neither the master label nor the secondary label exists in the combined optical signal, the network device contends for serving as the master node. For a specific implementation of the network device contending for serving as the master node, refer to descriptions in the foregoing method embodiments. Details are not described herein again.

In a possible implementation, the secondary label includes identification information of a communication node that generates the secondary label. The secondary label may be any secondary label mentioned in embodiments of this application. For this possible implementation, refer to descriptions in the foregoing method embodiments. Details are not described herein again.

In a possible implementation, the master label includes identification information of a communication node that generates the master label. The master label may be any master label mentioned in embodiments of this application. For this possible implementation, refer to descriptions in the foregoing method embodiments. Details are not described herein again.

In a possible implementation, the secondary label is modulated to an optical signal in a pilot manner. The secondary label may be any secondary label mentioned in embodiments of this application. For this possible implementation, refer to descriptions in the foregoing method embodiments. Details are not described herein again.

In a possible implementation, the master label is modulated to an optical signal in the pilot manner. The master label may be any master label mentioned in embodiments of this application. For this possible implementation, refer to descriptions in the foregoing method embodiments. Details are not described herein again.

FIG. 14 is a schematic diagram of a structure of a communication apparatus according to an embodiment of this application. The communication apparatus shown in FIG. 14 may be configured to perform some or all functions of the network device in the method embodiments described in FIG. 4 to FIG. 7, FIG. 12, and FIG. 13. The apparatus may be a network device, an apparatus in the network device, or an apparatus that can be used together with the network device. The communication apparatus may alternatively be a chip system. The communication apparatus shown in FIG. 14 may include a communication unit 1401 and a processing unit 1402. The processing unit 1402 is configured to perform data processing. A receiving unit and a sending unit are integrated into the communication unit 1401. The communication unit 1401 may also be referred to as a transceiver unit. Alternatively, the communication unit 1401 may be split into a receiving unit and a sending unit.

The communication unit 1401 is configured to receive a combined optical signal, where the combined optical signal is obtained by coupling optical signals sent by a plurality of communication nodes; the processing unit 1402 is configured to: if the network device is not a master node, detect whether a master label exists in the combined optical signal, where the master label indicates the master node; and the processing unit 1402 is further configured to: if it is detected that a first master label exists in the combined optical signal, where the first master label indicates the first master node, synchronize a local clock frequency with a clock frequency of the first master node.

In a possible implementation, the processing unit 1402 is further configured to: if it is detected that the first master label disappears, and the communication apparatus is not a secondary node, detect whether a secondary label exists in the combined optical signal, where the secondary label indicates the secondary node; and the processing unit 1402 is further configured to: if it is detected that the first secondary label exists in the combined optical signal, where the first secondary label indicates the first secondary node, synchronize the local clock frequency with a clock frequency of the first secondary node.

In a possible implementation, after synchronizing the local clock frequency with the clock frequency of the first secondary node, the processing unit 1402 is further configured to detect again whether the master label exists in the combined optical signal; and the processing unit 1402 is further configured to: if it is detected that a second master label exists in the combined optical signal, where the second master label indicates a second master node, synchronize the local clock frequency with a clock frequency of the second master node.

In a possible implementation, the communication unit 1401 is further configured to: if it is detected that the first master label disappears, and the communication apparatus is the secondary node, switch from sending an optical signal that carries a second secondary label to sending an optical signal that carries a third master label, where the second secondary label indicates that the communication apparatus is the secondary node, and the third master label indicates that the communication apparatus is the master node.

In a possible implementation, the processing unit 1402 is further configured to: in a process of synchronizing the local clock frequency with a clock frequency of the master node, if the communication apparatus is not the secondary node, detect whether the secondary label exists in the combined optical signal, where the secondary label indicates the secondary node; and the processing unit 1402 is further configured to: if it is detected that no secondary label exists in the combined optical signal, enable the communication apparatus to contend for serving as the secondary node.

In a possible implementation, a manner in which the processing unit 1402 enables the communication apparatus to contend for serving as the secondary node is specifically as follows: The processing unit 1402 sends, by using the communication unit 1401, the optical signal that carries the second secondary label; the processing unit 1402 detects whether a secondary label other than the second secondary label exists in the received combined optical signal; and if no secondary label other than the second secondary label is detected, the communication apparatus successfully contends for serving as the secondary node.

In a possible implementation, the manner in which the processing unit 1402 enables the communication apparatus to contend for serving as the secondary node is specifically as follows: The processing unit 1402 sends, by using the communication unit 1401, the optical signal that carries a second secondary label; the processing unit 1402 detects whether the secondary label other than the second secondary label exists in the received combined optical signal; if the secondary label other than the second secondary label is detected, the processing unit 1402 detects again, after a random latency, whether the secondary label other than the second secondary label exists in the received combined optical signal; and if no secondary label other than the second secondary label is detected, the processing unit 1402 sends again, by using the communication unit 1401, the optical signal that carries the second secondary label, to enable again the communication apparatus to contend for serving as the secondary node.

In a possible implementation, the processing unit 1402 is further configured to: when it is detected that neither the master label nor the secondary label exists in the combined optical signal, enable the communication apparatus to contend for serving as the master node, where the secondary label indicates the secondary node.

In a possible implementation, a manner in which the processing unit 1402 enables the communication apparatus to contend for serving as a master node is specifically as follows: The processing unit 1402 sends, by using the communication unit 1401, the optical signal that carries a third master label; the processing unit 1402 detects whether a master label other than the third master label exists in the received combined optical signal; and if no master label other than the third master label is detected, the communication apparatus successfully contends for serving as the master node.

In a possible implementation, the manner in which the processing unit 1402 enables the communication apparatus to contend for serving as the master node is specifically as follows: The processing unit 1402 sends, by using the communication unit 1401, the optical signal that carries the third master label; the processing unit 1402 detects whether the master label other than the third master label exists in the received combined optical signal; if the master label other than the third master label is detected, the processing unit 1402 detects again, after a random latency, whether the master label other than the third master label exists in the received combined optical signal; and if no master label other than the third master label is detected, the processing unit 1402 sends again, by using the communication unit 1401, the optical signal that carries the third master label, to enable again the communication apparatus to contend for serving as the master node.

In a possible implementation, the secondary label includes identification information of a communication node that generates the secondary label.

In a possible implementation, the secondary label is modulated to an optical signal in a pilot manner.

In a possible implementation, the master label includes identification information of a communication node that generates the master label.

In a possible implementation, the master label is modulated to an optical signal in the pilot manner.

Figure 15:
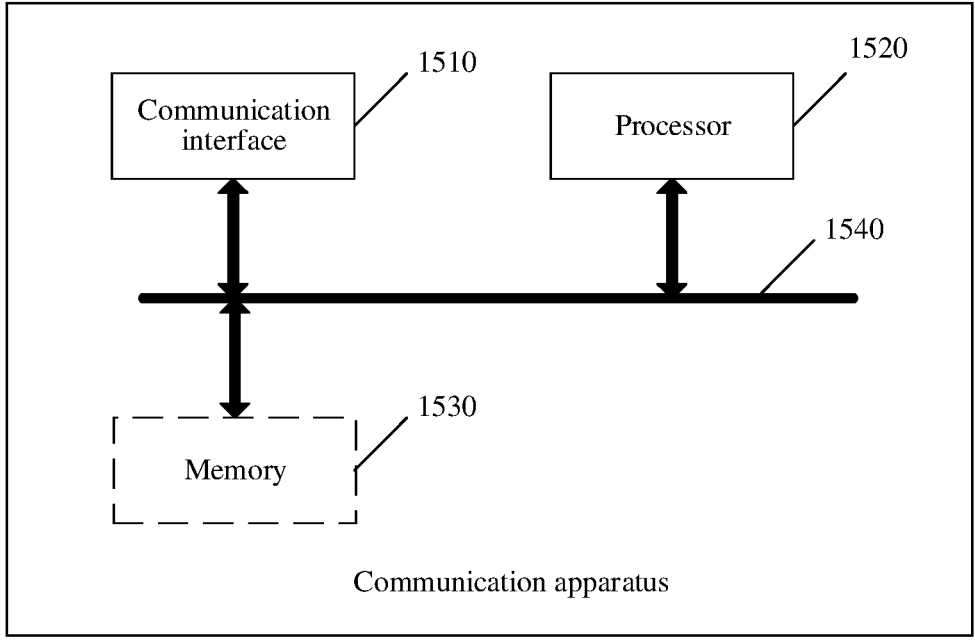
FIG. 15 is a schematic diagram of a structure of a communication apparatus according to an embodiment of this application.

FIG. 15 shows a communication apparatus 150 according to an embodiment of this application, and the communication apparatus 150 is configured to implement functions of the network device in FIG. 4 to FIG. 7, FIG. 12, and FIG. 13. The apparatus may be a network device or an apparatus used in the network device. The apparatus used in the network device may be a chip system or a chip in the network device. The chip system may include a chip, or may include a chip and another discrete component.

The communication apparatus 150 includes at least one processor 1520 and a communication interface 151o. The processor 1520 is configured to implement a processing function of the network device in the method provided in embodiments of this application.

For example, the processor 1520 is configured to detect whether a master label exists in a combined optical signal; and when detecting that a first master label exists in the combined optical signal, the processor 1520 is configured to synchronize a local clock frequency with a clock frequency of a first master node indicated by the first master label.

For another example, the processor 1520 is further configured to: when it is detected that the first master label disappears, and the communication apparatus 150 is not a secondary node, detect whether a secondary label exists in the combined optical signal; and when it is detected that a first secondary label exists in the combined optical signal, the processor 1520 is further configured to synchronize the local clock frequency with a clock frequency of a first secondary node indicated by the first secondary label.

For another example, the processor 1520 is further configured to: after synchronizing the local clock frequency with the clock frequency of the first secondary node, detect again whether the master label exists in the combined optical signal; and the processor 1520 is further configured to: when it is detected that a second master label exists in the combined optical signal, synchronize the local clock frequency with a clock frequency of a second master node indicated by the second master label.

For another example, the processor 1520 is further configured to: in a process of synchronizing the local clock frequency with a clock frequency of the master node, if the communication apparatus 150 is not the secondary node, detect whether the secondary label exists in the combined optical signal; and when it is detected that no secondary label exists in the combined optical signal, the processor 1520 is further configured to enable the communication apparatus 150 to contend for serving as the secondary node.

For another example, the processor 1520 is further configured to: when it is detected that neither the master label nor the secondary label exists in the combined optical signal, enable the communication apparatus 150 to contend for serving as the master node.

In this embodiment of this application, the communication interface may be a transceiver, an interface, or the like. The transceiver or the interface is configured to receive or send an optical signal. For example, the transceiver or the interface may be configured to receive the combined optical signal in the foregoing method embodiment. For another example, the transceiver or the interface may further send the optical signal that carries the second secondary label or the optical signal that carries the third master label in the foregoing method embodiment.

Optionally, the communication apparatus 150 may further include at least one memory 1530, and the memory 1530 is configured to store program instructions and/or data. The memory 1530 is coupled to the processor 1520. The coupling in this embodiment of this application may be an indirect coupling or a communication connection between apparatuses, units, or modules in an electrical form, a mechanical form, or another form, and is used for information exchange between the apparatuses, the units, or the modules. The processor 1520 may cooperate with the memory 1530. The processor 1520 may execute the program instructions stored in the memory 1530. At least one of the at least one memory may be included in the processor.

An embodiment of this application further provides a computer-readable storage medium. The computer-readable storage medium stores instructions. When the instructions run on a processor, method procedures in the foregoing method embodiments are implemented.

An embodiment of this application further provides a computer program product. When the computer program product runs on a processor, method procedures in the foregoing method embodiments are implemented.

It should be noted that, for brief description, the foregoing method embodiment is represented as a combination of a series of actions. However, a person skilled in the art should understand that this application is not limited to the described order of the actions, because according to this application, some operations may be performed in other orders or simultaneously. It should be further appreciated by a person skilled in the art that embodiments described in this specification all belong to example embodiments, and the involved actions and modules are not necessarily required by this application.

Cross-reference may be made to descriptions of embodiments provided in this application, and the descriptions of embodiments have different focuses. For a part not described in detail in an embodiment, refer to related descriptions of another embodiment. For ease of description and brevity, for functions of the apparatuses and devices provided in embodiments of this application and operations performed by the apparatuses and devices, refer to related descriptions of the method embodiments of this application. The method embodiments and the apparatus embodiments may also be mutually referenced, combined, or cited.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, or another programmable apparatus. The computer instructions may be stored in a computer-readable storage medium. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

What is claimed is:

1. A method, comprising:

receiving, by a network device, a combined optical signal, wherein the combined optical signal is obtained by coupling optical signals sent by a plurality of communication nodes;

in response to the network device not being a master node, detecting, by the network device, whether a master label exists in the combined optical signal, wherein the master label indicates the master node; and in response to detecting that a first master label exists in the combined optical signal, synchronizing, by the network device, a local clock frequency with a clock frequency of a first master node that is indicated by the first master label.

2. The method according to claim 1, wherein the method further comprises:

in response to detecting that the first master label disappears from the combined optical signal and the network device is not a secondary node, detecting, by the network device, whether a secondary label exists in the combined optical signal, wherein the secondary label indicates the secondary node; and in response to detecting that a first secondary label exists in the combined optical signal, synchronizing, by the network device, the local clock frequency with a clock frequency of a first secondary node that is indicated by the first secondary label.

3. The method according to claim 2, wherein after synchronizing, by the network device, the local clock frequency with the clock frequency of the first secondary node, the method further comprises:

detecting again, by the network device, whether the master label exists in the combined optical signal; and in response to detecting that a second master label exists in the combined optical signal, synchronizing, by the network device, the local clock frequency with a clock frequency of a second master node that is indicated by the second master label.

4. The method according to claim 1, wherein the method further comprises:

in response to detecting that the first master label disappears from the combined optical signal and the network device is a secondary node, switching, by the network device, from sending an optical signal that carries a second secondary label to sending an optical signal that carries a third master label, wherein the second secondary label indicates that the network device is the secondary node, and the third master label indicates that the network device is the master node.

5. The method according to claim 2, wherein the method further comprises:

in a process of synchronizing the local clock frequency with the clock frequency of the master node, in response to the network device not being the secondary node, detecting, by the network device, whether the secondary label exists in the combined optical signal, wherein the secondary label indicates the secondary node; and in response to detecting that no secondary label exists in the combined optical signal, contending for, by the network device, serving as the secondary node.

6. The method according to claim 5, wherein contending for, by the network device, serving as the secondary node comprises:

sending, by the network device, an optical signal that carries the second secondary label;

detecting, by the network device, whether a secondary label other than the second secondary label exists in the combined optical signal received from the plurality of communication nodes; and in response to no secondary label other than the second secondary label being detected, successfully contending for, by the network device, serving as the secondary node.

7. The method according to claim 5, wherein contending for, by the network device, serving as the secondary node comprises:

sending, by the network device, an optical signal that carries the second secondary label;

detecting, by the network device, whether a secondary label other than the second secondary label exists in the combined optical signal received from the plurality of communication nodes;

in response to the secondary label other than the second secondary label being detected, detecting again, by the network device after a random latency, whether the secondary label other than the second secondary label exists in the combined optical signal received from the plurality of communication nodes; and in response to no secondary label other than the second secondary label being detected after the random latency, sending again, by the network device, the optical signal that carries the second secondary label, to contend again for serving as the secondary node.

8. The method according to claim 2, wherein the method further comprises:

in response to detecting that neither the master label nor the secondary label exists in the combined optical signal, contending for, by the network device, serving as the master node, wherein the secondary label indicates the secondary node.

9. The method according to claim 8, wherein contending for, by the network device, serving as the master node comprises:

sending, by the network device, an optical signal that carries a third master label;

detecting, by the network device, whether a master label other than the third master label exists in the combined optical signal received from the plurality of communication nodes; and in response to no master label other than the third master label being detected, successfully contending for, by the network device, serving as the master node.

10. The method according to claim 8, wherein contending for, by the network device, serving as the master node comprises:

sending, by the network device, an optical signal that carries a third master label;

detecting, by the network device, whether a master label other than the third master label exists in the combined optical signal received from the plurality of communication nodes;

in response to the master label other than the third master label being detected, detecting again, by the network device after a random latency, whether the master label other than the third master label exists in the combined optical signal received from the plurality of communication nodes; and in response to no master label other than the third master label being detected after the random latency, sending again, by the network device, the optical signal that carries the third master label, to contend again for serving as the master node.

11. The method according to claim 2, wherein the secondary label comprises identification information of a communication node that generates the secondary label.

12. The method according to claim 2, wherein the secondary label is modulated to an optical signal in a pilot manner.

13. The method according to claim 1, wherein the master label comprises identification information of a communication node that generates the master label.

14. The method according to claim 1, wherein the master label is modulated to an optical signal in a pilot manner.

15. A communication apparatus, wherein the communication apparatus comprises:

an interface, configured to receive a combined optical signal, wherein the combined optical signal is obtained by coupling optical signals sent by a plurality of communication nodes;

one or more processors coupled to the interface; and a non-transitory computer-readable storage medium storing a program to be executed by the one or more processors, the program including instructions to:

in response to the communication apparatus not being a master node, detect whether a master label exists in the combined optical signal, wherein the master label indicates the master node; and in response to detecting that a first master label exists in the combined optical signal, synchronize a local clock frequency with a clock frequency of a first master node that is indicated by the first master label.

16. The communication apparatus according to claim 15, wherein the instructions include further instructions to:

in response to detecting that the first master label disappears from the combined optical signal and the communication apparatus is not a secondary node, detect whether a secondary label exists in the combined optical signal, wherein the secondary label indicates the secondary node; and in response to detecting that a first secondary label exists in the combined optical signal, synchronize the local clock frequency with a clock frequency of a first secondary node that is indicated by the first secondary label.

17. The communication apparatus according to claim 16, wherein the instructions include further instructions to:

after synchronizing the local clock frequency with the clock frequency of the first secondary node, detect again whether the master label exists in the combined optical signal; and in response to detecting that a second master label exists in the combined optical signal, synchronize the local clock frequency with a clock frequency of a second master node that is indicated by the second master label.

18. The communication apparatus according to claim 15, wherein:

the interface is further configured to in response to the one or more processors detecting that the first master label disappears from the combined optical signal and the communication apparatus is a secondary node, switch from sending an optical signal that carries a second secondary label to sending an optical signal that carries a third master label, wherein the second secondary label indicates that the communication apparatus is the secondary node, and the third master label indicates that the communication apparatus is the master node.

19. The communication apparatus according to claim 16, wherein the instructions include further instructions to:

in a process of synchronizing the local clock frequency with the clock frequency of the master node, in response to the communication apparatus not being the secondary node, detect whether the secondary label exists in the combined optical signal, wherein the secondary label indicates the secondary node; and in response to detecting that no secondary label exists in the combined optical signal, enable the communication apparatus to contend for serving as the secondary node.

20. The communication apparatus according to claim 19, wherein the instructions to enable the communication apparatus to contend for serving as the secondary node comprises instructions for:

sending, by the one or more processors through the interface, an optical signal that carries the second secondary label;

detecting, by the one or more processors, whether a secondary label other than the second secondary label exists in the combined optical signal received from the plurality of communication nodes; and in response to no secondary label other than the second secondary label being detected, successfully contending for, by the communication apparatus, serving as the secondary node.

* * * * *